United States Patent
Kalstein

[15] 3,705,336
[45] Dec. 5, 1972

[54] ELECTRIC CAPACITOR UNIT
[72] Inventor: Abraham G. Kalstein, New Bedford, Mass.
[73] Assignee: Aerorox Corporation, New Bedford, Mass.
[22] Filed: June 17, 1971
[21] Appl. No.: 154,085

[52] U.S. Cl..................................317/260, 317/258
[51] Int. Cl. ..............................................H01g 1/14
[58] Field of Search...............................317/260, 258

[56] References Cited
UNITED STATES PATENTS

| 3,182,238 | 4/1965 | Toder | 317/260 |
| 3,508,128 | 4/1970 | Allison | 317/260 X |
| 3,522,498 | 8/1970 | Price | 317/260 X |
| 3,596,152 | 7/1971 | Allison | 317/260 X |

Primary Examiner—E. A. Goldberg
Attorney—Arthur B. Colvin

[57] ABSTRACT

A capacitor unit incorporating at least two capacitor sections and comprising a strip of dielectric material having a metallized layer electrode thereon extending to one edge of said strip of dielectric material and being spaced from the other edge of said strip of dielectric material, a second strip of dielectric material extending the length of said first strip and positioned against said metallized layer and a plurality of longitudinally spaced strips of metal foil defining a corresponding plurality of electrodes to each of which a terminal tab is secured, the various strips and electrodes being wound into a coil and with the end of the coil at which the edges of the convolutions of the metallized electrode is exposed, being metallized and having a terminal tab connected to said metallized end.

3 Claims, 4 Drawing Figures

PATENTED DEC 5 1972 3,705,336

INVENTOR.
ABRAHAM G. KALSTEIN

BY

ATTORNEY

ELECTRIC CAPACITOR UNIT

As conducive to an understanding of the invention, it is to be noted that where a capacitor is formed from a plurality of layers of dielectric strips and foil electrodes, which are wound to form a cylindrical unit, due to the thickness of the layers, including the foil electrodes, the capacitor is relatively bulky in size. In addition, a capacitor using foil electrodes does not have self-healing qualities.

Where to reduce the size of the capacitor and to provide self-healing qualities, the electrodes are formed by metallizing one surface of the dielectric strips, although the resultant capacitor is smaller in size than a capacitor using separate foil electrodes, and has self-healing qualities, it has poor heat conductive properties due to the thinness of the layers forming the metallized electrodes.

Furthermore, where a capacitor is formed solely by the use of metallized electrodes, the cost of the materials is considerably higher than where separate metal foil electrodes are employed.

Accordingly, it is among the objects of the invention to provide a single capacitor unit which incorporates at least two capacitor sections, yet which is relatively small in size and simple in construction and may readily be fabricated at relatively low cost and which has self-heating properties and although utilizing a metallized dielectric strip as the common electrode for both capacitor sections has greatly improved heat dissipation qualities over a capacitor utilizing only metallized dielectric strips as electrodes.

According to the invention these objects are accomplished by the arrangement and combination of elements hereinafter described and more particularly recited in the claims.

In the accompanying drawings in which are shown one or more of various possible embodiments of the several features of the invention;

Figure 1:
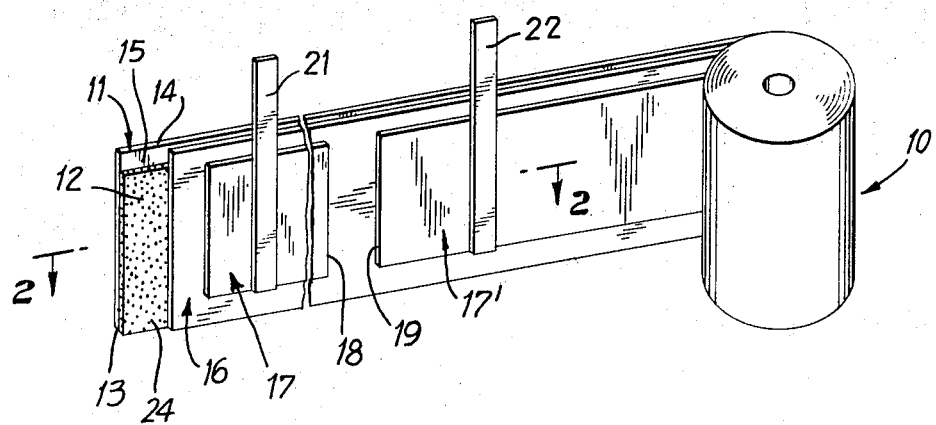
FIG. 1 is a perspective view of the capacitor unit in partially unwound condition.
Figure 2:
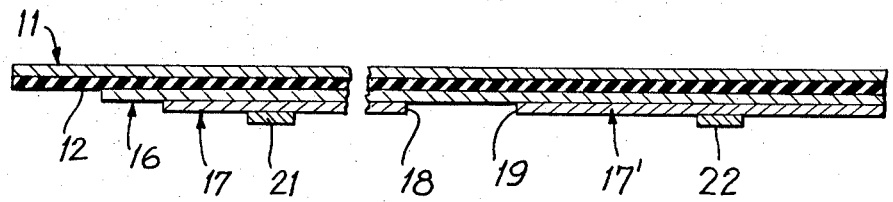
FIG. 2 is a longitudinal sectional view taken along line 2—2 of FIG. 1.

Referring now to the drawings, as shown in FIG. 1, the capacitor unit 10 comprises a continuous dielectric strip 11, of suitable insulating material such as kraft paper, synthetic resin such as polypropylene, fiberglass or other dielectric material.

An electrode 12 is positioned adjacent the dielectric strip 11 and according to the invention such electrode is formed by metallizing a layer of conducting material, illustratively aluminum, to one surface of the dielectric strip 11 by any suitable process such as vapor deposition, chemical deposition or other metal depositing method known in the art.

The metallized surface or electrode 12 as shown in FIG. 1, extends from the lower edge 13 of the dielectric strip 11 to nearly the upper edge 14 thereof, defining a non-metallized region 15.

Associated with the metallized dielectric strip 11, is a non-metallized dielectric strip 16 which preferably is of the same material as the dielectric strip 11. A plurality of electrodes 17, 17', illustratively strips of aluminum foil are positioned adjacent the dielectric strip 16, the electrodes 17, 17' being narrower in width than dielectric strip 16 as is clearly shown in FIG. 1 so that the lateral edges of the electrodes 17, 17' are inwardly spaced from the ends of the capacitor 10.

The foil strip or electrode 17, terminates at 18 so that it is longitudinally spaced from the leading edge 19 of the foil strip or electrode 17'.

Figure 3:
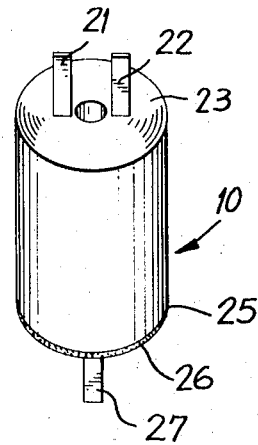
FIG. 3 is a perspective view of the capacitor unit according to one embodiment of the invention.

Conventional terminal tabs 21, 22 of conducting material, such as tinned copper foil, are positioned against the foil strips 17, 17'. Thus, when the juxtaposed strips 11, 16, 17, 17' are wound on a conventional winding arbor to form the cylindrical capacitor unit 10, the tabs 21, 22 will provide a circuit to the associated electrodes 17, 17', the tabs 21, 22 protruding from one end 23 of the capacitor unit 10 as shown in FIG. 3.

Figure 4:
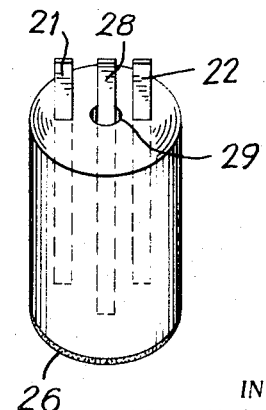
FIG. 4 is a view similar to FIG. 3 of another embodiment of the invention.

When the capacitor unit 10 is wound, it is apparent that the metallized edge 24 of the electrode layer 12 formed on the dielectric strip 11 will be exposed at the end 25 of the unit. In accordance with the invention, the convolutions of the exposed edge 24 is sprayed with a suitable conductive metal such as aluminum solder to define a common terminal 26. Thereupon, according to the embodiment of the invention shown in FIG. 3, a terminal tab 27 is secured as by soldering to the sprayed end 26 of the capacitor unit so as to extend axially outward therefrom, or as shown in the embodiment of FIG. 4, one end of a terminal tab 28 is secured to the sprayed end 26 and the tab 28 is then threaded through the bore 29 defined by the winding arbor so that the free end of tab 28 protrudes axially in the same direction as tabs 21, 22. In addition, the end of tab 27 may be soldered to sprayed end 26 and brought along the outer surface of the capacitor section 10 parallel to the axis thereof, so that the free end of tab 27 would protrude beyond end 23 of the capacitor section parallel to tabs 22, 22.

As a result of the construction above described, two capacitor sections are formed in a single unit, the tab 27, 28 connected to the metallized electrode 12 defining a common terminal for the two capacitor sections.

Having thus described my invention, what I claim as new and desire to secure by Letters Patent of the United States is:

1. A wound dielectric capacitor unit comprising an elongated strip of dielectric material, a layer of conductive material deposited on one surface of said strip defining a metallized electrode, said metallized layer extending to one edge of said strip and being spaced from the other edge thereof, a layer of dielectric material associated with said elongated strip, a layer of metal foil defining an electrode contacting said layer of dielectric material and having its lateral edges inwardly spaced from the lateral edges of said layer of dielectric material, a terminal comprising a tab of conductive material secured at one end to said metal foil electrode and protruding from one end of said capacitor, said other end of said capacitor having a metallized coating to connect the exposed edges of the metallized electrode on the elongated strip of dielectric material, said wound capacitor unit having an axial opening, a second terminal tab of conductive material extending through said opening, one end of said second terminal tab protruding from the same end of the capacitor unit from which the first terminal tab unit protrudes and the other end of said second terminal tab being electrically connected to said metallized end of said capacitor unit.

2. A wound dielectric capacitor unit comprising an elongated strip of dielectric material, a layer of conductive material deposited on one surface of said strip defining a metallized electrode, said metallized layer extending to one edge of said strip and being spaced from the other edge thereof, a layer of dielectric material associated with said elongated strip, a layer of metal foil defining an electrode contacting said layer of dielectric material and having its lateral edges inwardly spaced from the lateral edges of said layer of dielectric material, a terminal comprising a tab of conductive material secured at one end to said metal foil electrode and protruding from one end of said capacitor, said other end of said capacitor having a metallized coating to connect the exposed edges of the metallized electrode on the elongated strip of dielectric material, and a second terminal tab of conductive material electrically connected to the metallized end of said capacitor unit remote from the end from which the first terminal tab protrudes.

3. A wound electrical capacitor unit comprising an elongated strip of dielectric material, a layer of conductive material deposited on one surface of said strip defining a metalized electrode, said metalized layer extending to one edge of said strip and being spaced from the other edge thereof, a second elongated strip of dielectric material associated with said first elongated strip, at least a pair of elongated metal foil strips each defining an electrode positioned against the second dielectric strip with the trailing end of the first metal foil electrode being spaced from the leading end of the second metal foil electrode, and with the lateral edges of said metal foil electrodes being inwardly spaced from the lateral edges of said second dielectric strip, a terminal tab electrically connected at one end to each of said metal foil electrodes, said terminal tabs protruding beyond the same end of said capacitor, said other end of the capacitor having a metalized coating to connect the exposed edges of the metalized electrode on the first dielectric strip to define an electrode common to both of said foil electrodes.

* * * * *